US007786955B2

(12) United States Patent
Han et al.

(10) Patent No.: US 7,786,955 B2

(45) Date of Patent: Aug. 31, 2010

(54) PLASMA DISPLAY APPARATUS

(75) Inventors: Jung Gwan Han, Gumi-si (KR); Yang Woog Ryu, Gumi-si (KR); Sonic Kim, Incheon (KR); Dong Kwon Choi, Ulsan (KR)

(73) Assignee: LG Electronics Inc., Seoul (KR)

( * ) Notice: Subject to any disclaimer, the term of this patent is extended or adjusted under 35 U.S.C. 154(b) by 1285 days.

(21) Appl. No.: 11/312,530

(22) Filed: Dec. 21, 2005

(65) Prior Publication Data

US 2006/0132388 A1 Jun. 22, 2006

(30) Foreign Application Priority Data

Dec. 22, 2004 (KR) ..................... 10-2004-0110639

(51) Int. Cl.
*G09G 3/28* (2006.01)
*G06F 3/038* (2006.01)

(52) U.S. Cl. ............................ 345/63; 345/55; 345/60; 345/72; 345/204; 345/205

(58) Field of Classification Search .................. 345/55, 345/60, 63, 68, 72, 204, 205, 206, 211, 212, 345/213

See application file for complete search history.

(56) References Cited

U.S. PATENT DOCUMENTS 4,320,418 A 3/1982 Pavliscak .................... 358/240
6,262,699 B1 7/2001 Suzuki et al. ................. 345/68
6,480,180 B1 * 11/2002 Moon .......................... 345/98
7,109,980 B2 * 9/2006 Shigeta et al. .............. 345/204
2002/0050788 A1 5/2002 Kimura et al. .............. 313/582
2004/0008194 A1 * 1/2004 Shigeta et al. .............. 345/204
2004/0233132 A1 11/2004 Choi et al. ..................... 345/60
2004/0242171 A1 * 12/2004 Hosokawa et al. ....... 455/127.1
2007/0268212 A1 * 11/2007 Han et al. ...................... 345/60

FOREIGN PATENT DOCUMENTS

EP 1 376 526 A2 1/2004

OTHER PUBLICATIONS

Korean Office Action dated Apr. 3, 2006.
European Office Action date Feb. 14, 2008.
Hosoi, K. et al., "High Performance New Address Data Transmission System For HighImage Quality "Super CLEAR" Driving Method"; IDW Dec. 3, 2003, pp. 1699-1700.
"LVDS Owner's Manual, Moving InfowWith LVDS," LVDS Owner's Manual, 2000, pp. 1-17 (XP-002232434).
Dieta, Jim, "M-LVDS: A New Standard for High-Spped Multipoint Data Buses," TECHONLINE, May 1, 2001, pp. 1-4; URL:<http:///www.techonloine.com/ community/ related_content/1047?print> (XP002375412).
European Search Report dated Apr. 3, 2006.

* cited by examiner

*Primary Examiner*—My-Chau T Tran
(74) *Attorney, Agent, or Firm*—Ked & Associates LLP

(57) ABSTRACT

A plasma display apparatus includes an image data transmitter to convert an externally input image signal into image data and to transmit the converted image data, an image data receiver to receive the image data and to restore an image signal from the image data, and a data driver to supply the restored image signal to an address electrode of the plasma display panel through a switching operation. The image data may be transmitted as a differential signal.

10 Claims, 14 Drawing Sheets

PLASMA DISPLAY APPARATUS

This Nonprovisional application claims priority under 35 U.S.C. §119(a) on Patent Application No. 10-2004-0110639 filed in Korea on Dec. 22, 2004 the entire contents of which are hereby incorporated by reference.

BACKGROUND OF THE INVENTION

1. Field of the Invention

The present invention relates to a plasma display apparatus, and more particularly, to a plasma display apparatus, in which it can reduce the noise of a data pulse.

2. Description of the Background Art

In general, a plasma display panel comprises a front panel and a rear panel. A barrier rib formed between the front panel and the rear panel forms one cell. Each cell is filled with an inert gas comprising a primary discharge gas, such as neon (Ne), helium (He) or a mixed gas of Ne+He, and a small amount of xenon (Xe). A plurality of the cells forms one pixel. For example, a red (R) discharge cell, a green (G) discharge cell and a blue (B) discharge cell form one pixel.

In the plasma display panel constructed above, when the inert gas is discharged with a high frequency voltage, it generates vacuum ultraviolet rays. Phosphors formed between the barrier ribs are excited to display images. The plasma display panel can be made thin and light, and has thus been in the spotlight as the next-generation display devices.

A plurality of electrodes, such as a scan electrode Y, a sustain electrode Z and an address electrode X, is formed in the plasma display panel. A predetermined driving voltage is applied to the plurality of electrodes to generate a discharge, whereby images are displayed.

Drivers for supplying the driving voltage to the above-described electrodes are connected to the electrodes.

For example, a data driver can be connected to the address electrode X of the electrodes of the plasma display panel, and a scan driver can be connected to the scan electrode Y of the electrodes of the plasma display panel.

The plasma display panel in which a plurality of electrodes is formed as described above i.e., what a driver for supplying a predetermined driving voltage to the plurality of electrodes of the plasma display panel is comprised is called a "plasma display apparatus".

The plasma display apparatus displays images by generating a discharge within the discharge cell of the plasma display panel, as described above. For example, the plasma display apparatus can generate a reset discharge, an address discharge and a sustain discharge. In this case, the address discharge is a discharge for selecting a discharge cell in which a sustain discharge (i.e., a primary discharge for displaying images, of the plurality of discharge cell) will be generated.

To generate the address discharge, a predetermined image signal is supplied to the address electrode X formed in the plasma display panel as a data pulse form.

In this case, in the prior art plasma display apparatus, relatively strong noise is generated in an image signal supplied to the address electrode X, i.e., a data pulse. Therefore, a problem arises because electrical damage is given to the driving circuit of the plasma display apparatus.

There is also another problem in that the picture quality of an image implemented in the prior art plasma display apparatus is degraded and even worse an images are not displayed.

An amount of noise generated in the image signal is varied depending on factors, such as resistance and the length of a transmission line of an image signal.

More particularly, as the size of a plasma display panel increases, the length of the transmission line of the image signal is lengthened. This results in further strong noise occurring in the image signal. Therefore, problems arise because electrical damage to the driving circuit is increased and the picture quality of an image is further degraded.

SUMMARY OF THE INVENTION

Accordingly, an object of the present invention is to solve at least the problems and disadvantages of the background art.

It is an object of the present invention to provide a plasma display apparatus in which noise generated in an image signal supplied to an address electrode X of a plasma display panel is reduced, enhancing the reliability of a driving apparatus and preventing the picture quality of an image implemented from being degraded.

A plasma display apparatus according to an aspect of the present invention of the present invention comprises a low voltage image data transmitter for converting an externally input image signal into low voltage image data and for transmitting the converted low voltage image data, a low voltage image data receiver for receiving the low voltage image data and for restoring an image signal, and a data drive IC unit for supplying the image signal restored by the low voltage image data receiver to an address electrode of a plasma display panel through a switching operation.

A plasma display apparatus according to another aspect of the present invention of the present invention comprises a low voltage image data transmitter for converting an externally input image signal into low voltage image data and for transmitting the converted low voltage image data, a low voltage image data receiver for receiving the low voltage image data and for restoring an image signal, a buffer unit for buffering the image signal restored by the low voltage image data receiver, and a data drive IC unit for supplying the image signal buffered in the buffer unit to an address electrode of a plasma display panel through a switching operation.

A plasma display apparatus according to further another aspect of the present invention of the present invention comprises a plasma display panel comprising a first address electrode group and a second address electrode group, which correspond to a first screen region and a second screen region of a screen, respectively, a first data driver for driving the first address electrode group, and a second data driver for driving the second address electrode group, wherein each of the first data driver and the second data driver comprises a low voltage image data transmitter for converting an externally input image signal into low voltage image data and for transmitting the converted low voltage image data, a low voltage image data receiver for receiving the low voltage image data and for restoring an image signal, and a data drive IC unit for supplying the image signal restored by the low voltage image data receiver to any one of the first address electrode group and the second address electrode group through a switching operation.

In accordance the present invention, in the transmission process of an image signal, a low voltage signal comprising a first signal and a second signal, preferably at least one of a Low Voltage Differential Signals (LVDS), a Bus Low Voltage Differential Signals (BLVDS) and a Multipoint Low Voltage Differential Signals (MLVDS) is employed. This can reduce the influence of EMI noise on the image signal. Therefore, the present invention is advantageous in that the operational reliability of a plasma display apparatus can be enhanced and the picture quality of an image implemented can be prevented from being degraded. It is also possible to save power consumption.

Furthermore, in accordance the present invention, a data board is omitted, and image data of a low voltage is directly supplied from a control board to a flexible substrate. Therefore, there are advantages in that the cost incurred by the data board can be saved and the manufacturing unit cost of a driving apparatus of a plasma display panel can be saved accordingly.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Figure 1:
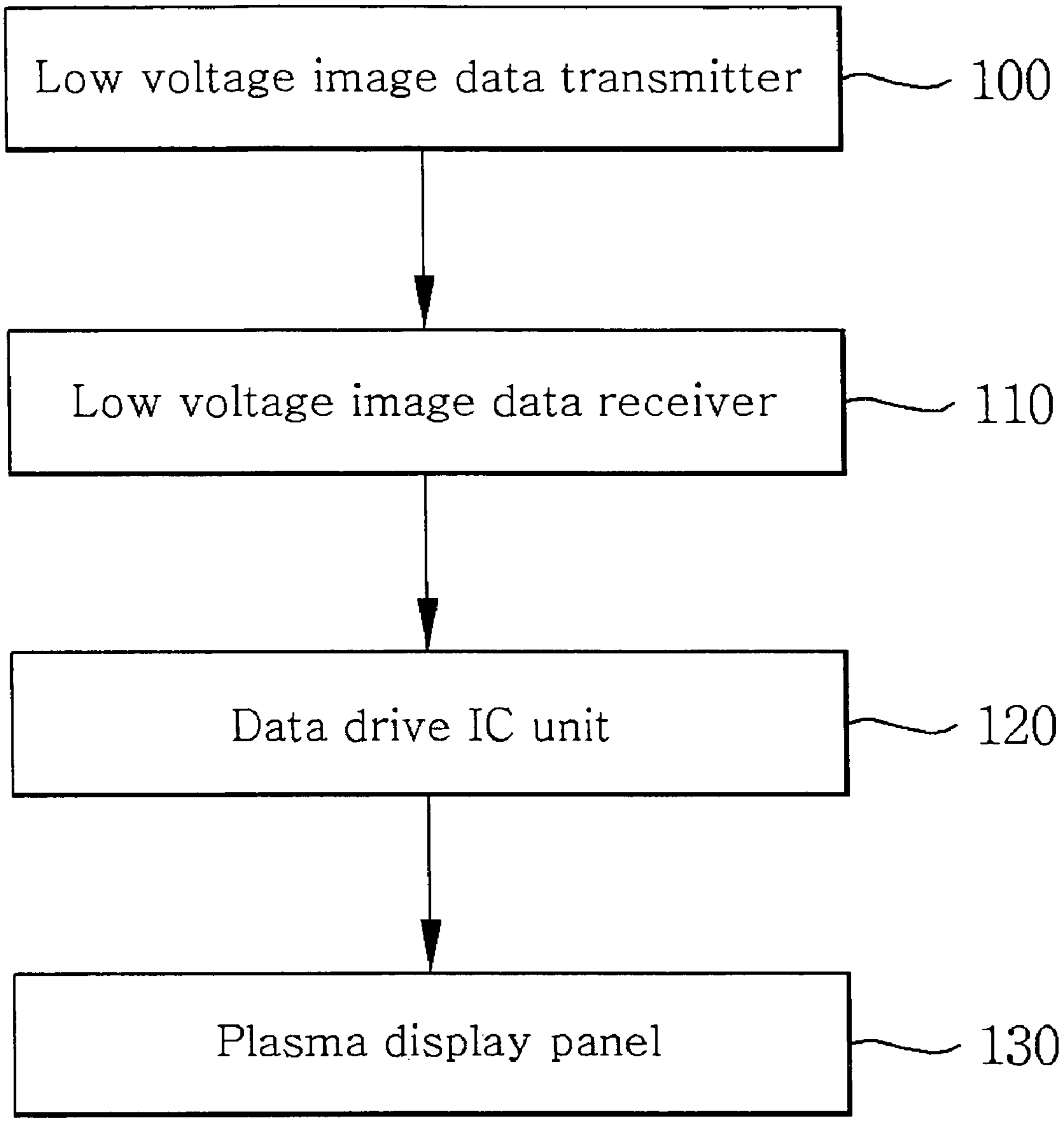
FIG. 1 illustrates the construction of a plasma display apparatus according to the present invention.

Preferred embodiments of the present invention will be described in a more detailed manner with reference to the drawings.

A plasma display apparatus according to the present invention comprises a low voltage image data transmitter for converting an externally input image signal into low voltage image data and for transmitting the converted low voltage image data, a low voltage image data receiver for receiving the low voltage image data and for restoring an image signal, and a data drive IC unit for supplying the image signal restored by the low voltage image data receiver to an address electrode of a plasma display panel through a switching operation.

Furthermore, the low voltage image data receiver and the data drive IC unit are commonly disposed on one flexible substrate.

Furthermore, the low voltage image data receiver and the data drive IC unit are integrated.

Furthermore, one or more of the data drive IC unit are located on a flexible substrate.

Furthermore, the low voltage image data transmitter and the low voltage image data receiver are respectively disposed on boards separated from the data drive IC unit.

Furthermore, the low voltage image data is a low voltage signal comprising a first signal and an inverted second signal of the first signal. The low voltage image data transmitter converts the image signal into the low voltage signal and transmits the converted low voltage signal to the low voltage image data receiver.

Furthermore, the low voltage image data receiver restores the image signal using a difference between the voltage level of the first signal and the voltage level of the second signal.

Furthermore, the low voltage signal is any one of a Low Voltage Differential Signal (LVDS), a Bus Low Voltage Differential Signal (BLVDS) and a Multipoint Low Voltage Differential Signal (MLVDS).

Furthermore, a difference between the voltage level of the first signal and the voltage level of the second signal ranges from more than 0.2V to less than 0.5V.

Furthermore, a difference in a voltage level between the first signal and the second signal ranges from 0.3V to 0.4V.

Furthermore, the low voltage image data transmitter is mounted on a control board for controlling the driving of the plasma display panel.

A plasma display apparatus according to another aspect of the present invention of the present invention comprises a low voltage image data transmitter for converting an externally input image signal into low voltage image data and for transmitting the converted low voltage image data, a low voltage image data receiver for receiving the low voltage image data and for restoring an image signal, a buffer unit for buffering the image signal restored by the low voltage image data receiver, and a data drive IC unit for supplying the image signal buffered in the buffer unit to an address electrode of a plasma display panel through a switching operation.

Furthermore, the buffer unit comprises a memory unit for storing the image signal restored by the low voltage image data receiver.

Furthermore, the buffer unit supplies a corresponding image signal to the data drive IC unit when the supply of data is requested where the image signal restored by the low voltage image data receiver is previously stored.

Furthermore, the buffer unit and the low voltage image data receiver are commonly disposed on one board separated from the data drive IC unit.

Furthermore, the buffer unit and the low voltage image data receiver are integrated.

A plasma display apparatus according to further another aspect of the present invention of the present invention comprises a plasma display panel comprising a first address electrode group and a second address electrode group, which correspond to a first screen region and a second screen region of a screen, respectively, a first data driver for driving the first address electrode group, and a second data driver for driving the second address electrode group, wherein each of the first data driver and the second data driver comprises a low voltage image data transmitter for converting an externally input image signal into low voltage image data and for transmitting the converted low voltage image data, a low voltage image data receiver for receiving the low voltage image data and for restoring an image signal, and a data drive IC unit for supplying the image signal restored by the low voltage image data receiver to any one of the first address electrode group and the second address electrode group through a switching operation.

Furthermore, in the first data driver and the second data driver, the low voltage image data receiver and the data drive IC unit are commonly disposed on one flexible substrate.

Furthermore, in the first data driver and the second data driver, the low voltage image data receiver and the data drive IC unit are integrated.

Furthermore, in the first data driver and the second data driver, the low voltage image data transmitter and the low voltage image data receiver are respectively disposed on boards separated from the data drive IC unit.

A plasma display apparatus of the present invention will now be described in detail in connection with a preferred embodiment with reference to accompanying drawings.

FIG. 1 illustrates the construction of a plasma display apparatus according to the present invention.

Referring to FIG. 1, the plasma display apparatus of the present invention comprises a low voltage image data transmitter 100, a low voltage image data receiver 110 and a data drive IC unit 120.

The low voltage image data transmitter 100 converts an externally input image signal into low voltage image data and transmits the converted image data.

The low voltage image data receiver 110 receives the low voltage image data from the low voltage image data transmitter 100 and restores an image signal from the received low voltage image data.

The data drive IC unit 120 supplies the image signal, which is restored by the low voltage image data receiver 110, to an address electrode X of a plasma display panel 130 through a switching operation.

In this case, an example of the plasma display panel 130 applied to the plasma display apparatus of the present invention will be described with reference to FIG. 2.

Figure 2:
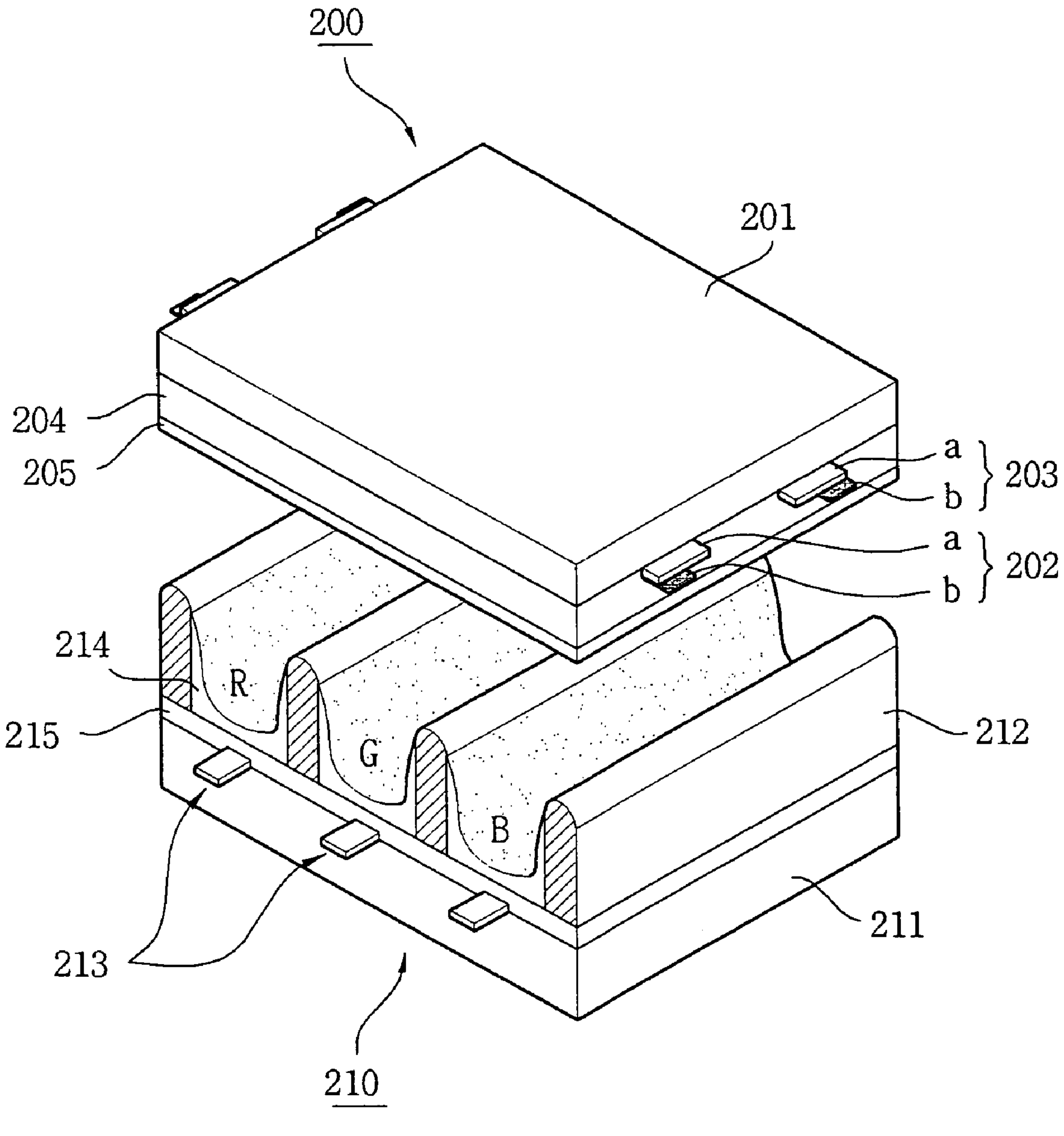
FIG. 2 illustrates an example of the structure of a plasma display panel applied to the plasma display apparatus according to the present invention.

FIG. 2 illustrates an example of the structure of a plasma display panel applied to the plasma display apparatus according to the present invention.

As shown in FIG. 2, the plasma display panel 130 applied to the plasma display apparatus of the present invention comprises a front panel 200 and a rear panel 210. In the front panel 200, a scan electrode 202, Y and a sustain electrode 203, Z are formed on a front substrate 201 serving as a display surface on which images are displayed. In the rear panel 210, a plurality of address electrodes 213, X crossing the scan electrode 202, Y and the sustain electrode 203, Z is arranged on a rear substrate 211 serving as a rear surface. The front panel 200 and the rear panel 210 are combined in parallel with a predetermined distance therebetween.

The front panel 200 comprises pairs of the scan electrode 202, Y and the sustain electrode 203, Z, which mutually discharge within one discharge cell and sustain the emission of a discharge cell. In other words, each of the scan electrode 202, Y and the sustain electrode 203, Z comprises a transparent electrode (a) formed of a transparent ITO material and a bus electrode (b) formed of a metal material. The scan electrode 202, Y and the sustain electrode 203, Z are covered with one or more dielectric layers 204 for limiting a discharge current and providing insulation between the electrode pairs. A protection layer 205 having deposited Magnesium Oxide (MgO) thereon is formed on the dielectric layers 204 in order to facilitate discharge conditions.

In the rear panel 210, barrier ribs 212 of a stripe form (or a well form), for forming a plurality of discharge spaces, i.e., discharge cells are arranged in parallel. Furthermore, the plurality of address electrodes 213, X, which perform an address discharge to generate vacuum ultraviolet rays, are disposed parallel to the barrier ribs 212. R, G and B phosphor layers 214 that radiate a visible ray for displaying images during an address discharge are coated on a top surface of the rear panel 210. A lower dielectric layer 215 for protecting the address electrodes 213, X is formed between the address electrodes 213, X and the phosphor layers 214.

There is shown in FIG. 2 only an example of the plasma display panel that can be applied to the present invention. It is, however, to be understood that the present invention is not limited to the structure of FIG. 2. Furthermore, it has been shown in FIG. 2 that the scan electrode 202 Y, the sustain electrode 203, Z and the address electrodes 213 X are formed in the plasma display panel 130. However, the electrodes of the plasma display panel 130 applied to the plasma display apparatus of the present invention can omit one or more of the scan electrode 202 Y and the sustain electrode 203 Z.

It has also been shown and described that each of the scan electrode 202, Y and the sustain electrode 203, Z comprises the transparent electrode (a) and the bus electrode (b). However, one or more of the scan electrode 202, Y and the sustain electrode 203, Z can include only the bus electrode (b).

Furthermore, it has been shown and described that the scan electrode 202, Y and the sustain electrode 203, Z are comprised in the front panel 200, and the address electrode 213, X is comprised in the rear panel 210. However, the entire electrodes can be formed in the front panel 200, or at least one of the scan electrode 202, Y, the sustain electrode 203, Z and the address electrode 213, X can be formed on the barrier ribs 212.

In consideration of the above description, the plasma display panel applicable to the present invention is one in which the plurality of address electrodes 213, X for supplying a driving voltage is formed except for other conditions.

Description will be given with reference to FIG. 1 again.

The operation of the plasma display apparatus shown in FIG. 1 according to the present invention will be described. If an image signal is received from the outside, the low voltage image data transmitter 100 converts the received image signal into low voltage image data and transmits the converted low voltage image data to the low voltage image data receiver 110.

The low voltage image data receiver 110 receives the low voltage image data from the low voltage image data transmitter 100, and restores an image signal, which was a signal prior to the conversion by the low voltage image data transmitter 100, from the received low voltage image data. The data drive IC unit 120 supplies the restored image signal to the address electrode X of the plasma display panel 130 through a predetermined switching operation.

In FIG. 1, only the process of converting an input image signal into low voltage image data and transmitting and receiving the low voltage image data has been shown. However, a variety of image processing processes, such as inverse gamma correction and gain control, can be added prior to the input image signal is converted into the low voltage image data. This will be below described with reference to FIG. 3.

Figure 3:
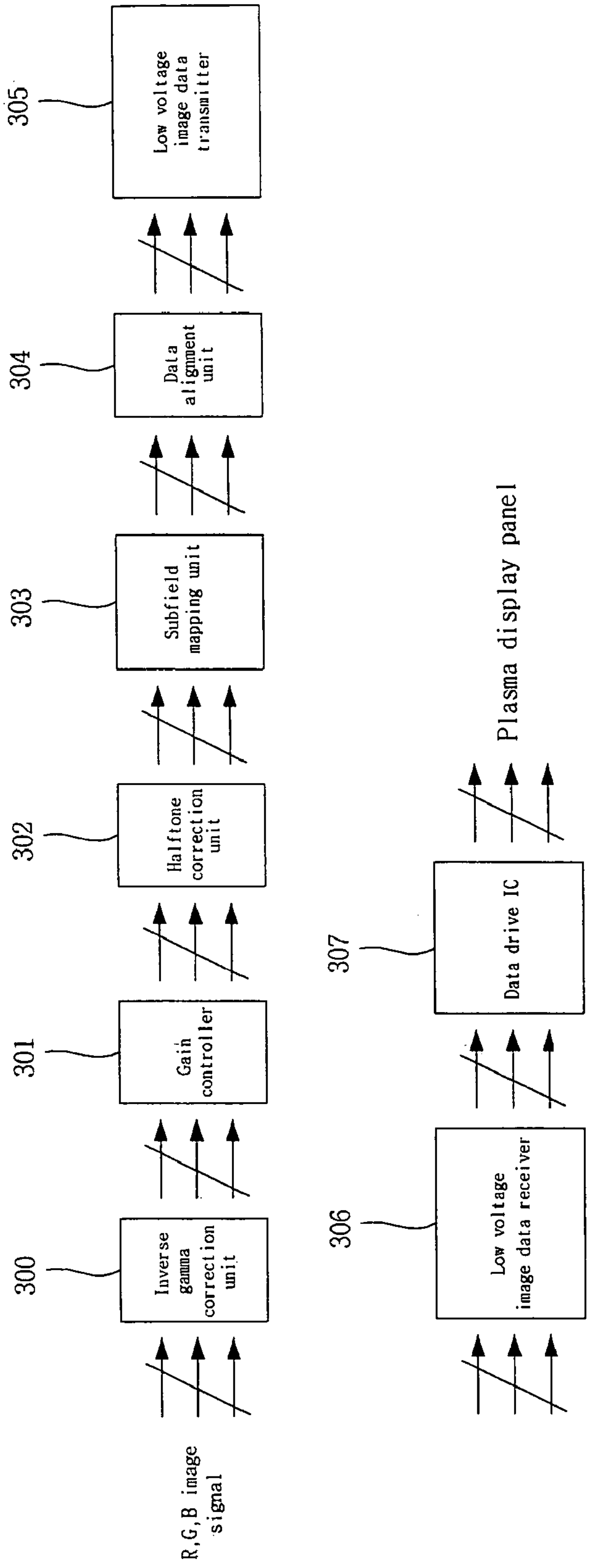
FIG. 3 illustrates an image processing process in the plasma display apparatus of the present invention.

FIG. 3 illustrates an image processing process in the plasma display apparatus of the present invention.

Referring to FIG. 3, the plasma display apparatus of the present invention can further comprise an inverse gamma correction unit 300, a gain controller 301, a halftone correction unit 302, a subfield mapping unit 303 and a data alignment unit 304.

The inverse gamma correction unit 300 performs an inverse gamma correction process on red (R), green (G) and blue (B) image signals received from the outside, e.g., a Video Signal Controller (VSC).

The gain controller 301 controls the data level of the image signal on which the inverse gamma correction process has been performed by the inverse gamma correction unit 300.

The halftone correction unit 302 performs an error diffusion or dithering process on the image signal whose data level has been controlled in order to improve the capability of representing gray levels.

The subfield mapping unit 303 performs a subfield mapping process on the image signal whose halftone has been controlled by the halftone controller 302.

The data alignment unit 304 realigns the image signals on which the subfield mapping process has been performed by the subfield mapping unit 303 on a subfield basis.

The low voltage image data transmitter 305 converts the image signal, which has been image-processed through the above process, into image data of a low voltage and transmits the converted image data.

More preferably, the low voltage image data transmitter 305 can convert an image signal, which has been image-processed through a predetermined process, into a LVDS (Low Voltage Differential Signals), and transmits the converted LVDS.

That is, the low voltage image data transmitter 305 converts image data that have been realigned on a subfield basis into image data of a low voltage and transmits the converted image data. For example, the image signal can be converted into a low voltage signal comprising a first signal and an inverted second signal of the second signal, and is then transmitted to the low voltage image data receiver 306.

The low voltage image data receiver 306 restores an image signal using a difference in a voltage level between the first signal and the second signal of the low voltage signal received from the low voltage image data transmitter 305.

In more detail, the low voltage image data receiver 306 senses a difference in a voltage between the first signal and the inverted second signal of the first signal and restores an original image signal, i.e., an image signal that has been subfield-mapped and realigned every address electrode X.

Furthermore, the data drive IC 307 supplies the restored image signal to the address electrode X of the plasma display panel through a predetermined switching process as a data pulse.

The operation of the low voltage image data transmitter 305 and the low voltage image data receiver 306 will be described below with reference to FIG. 4.

Figure 4:
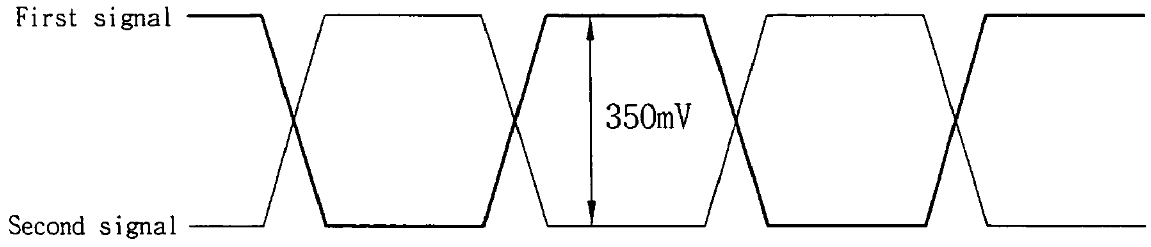
FIG. 4 illustrates the operation of a low voltage image data transmitter and a low voltage image data receiver.

FIG. 4 illustrates the operation of a low voltage image data transmitter and a low voltage image data receiver.

There is shown in FIG. 4 an example of the structure of low voltage image data that has been converted by the low voltage image data transmitter.

That is, the low voltage image data transmitter converts an input image signal into low voltage image data comprising a first signal and an inverted second signal of the first signal and transmits the converted data, as shown in FIG. 4. In this case, a difference in a voltage level between signals converted by the low voltage image data transmitter, i.e., a difference in a voltage level between the first signal and the second signal can be set in the range of 0.2V to 0.5V. More preferably, a difference in a voltage level between the first signal and the second signal can be set in the range of 0.3V to 0.4V.

The reason why a difference in a voltage level between the first signal and the second signal is set to range from 0.3V to 0.4V as described above is as follows. If a difference in a voltage level between the first signal and the second signal is less than 0.3V, the low voltage image data receiver 306 is difficult to sense a voltage level between the first signal and the second signal. Meanwhile, if a difference in a voltage level between the first signal and the second signal is 0.4V or higher, the swing width of the voltage of the first signal and the second signal excessively increases. As a result, when the first signal and the second signal are transmitted and received, power consumption is increased.

It has been shown in FIG. 4 that a difference in a voltage level between the first signal and the second signal is set to 0.35V. However, 0.35V is only an example of a difference in a voltage level between the first signal and the second signal, but the present invention is not limited thereto.

From FIG. 4, it can be seen that a difference in a voltage between two signals, i.e., the first signal and the second signal keeps constant regardless of an absolute voltage level between the first signal and the second signal. Therefore, when transmitting and receiving the low voltage image data as shown in FIG. 4, generation of noise can be significantly reduced. This will be described below with reference to FIG. 5.

Figure 5:
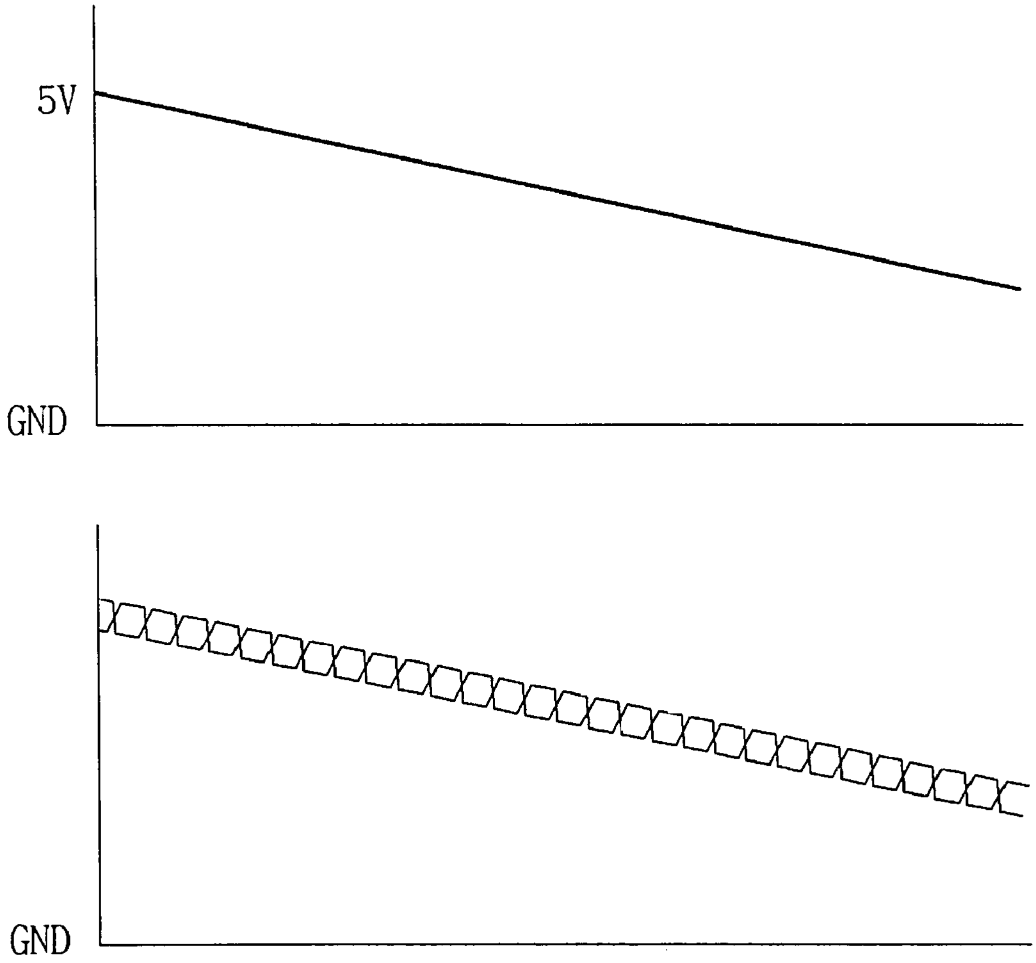
FIG. 5 illustrates receiving and transmitting characteristics of low voltage image data in the plasma display apparatus of the present invention.

FIG. 5 illustrates receiving and transmitting characteristics of low voltage image data in the plasma display apparatus of the present invention.

Referring to FIG. 5, (a) shows the pattern of image data that are transmitted and received in the prior art plasma display apparatus. Referring to (a), in the prior art plasma display apparatus, an image signal of approximately 5V is transmitted up to the data drive IC unit. As a transmission path of the image signal becomes long, resistance is increased and a voltage drop becomes severe. As a result, an original image signal and an image signal that reaches the data drive IC unit may be different from each other.

Consequently, as an amount of a data pulse supplied to the address electrode of the plasma display panel is reduced, a discharge can become unstable. Therefore, problems arise because the picture quality of an image that is implemented is degraded, a desired image is even worse not implemented, and so on.

Meanwhile, referring to (b), image data that are transmitted by the low voltage image data transmitter of the plasma display apparatus according to the present invention are transmitted in the form of a pair of LVDSs. For example, in a state where the first signal and the second signal have a predetermined difference in a voltage level, image data are transmitted from the low voltage image data transmitter to the low voltage image data receiver. In this case, an absolute voltage level of a pair of differential signals can be varied due to the influence of resistance components, etc., but a difference in a voltage level between the first signal and the second signal keeps constant. For example, in the case where noise is generated in a pair of differential signals, noise is generated both in the first signal and the second signal, but a difference in a voltage level between the first signal and the second signal is not significantly changed. As a result, in the case where the image data are supplied to the address electrode of the plasma display panel through the low voltage image data transmitter and the low voltage image data receiver, the image data can be transmitted stably because a voltage level of the first signal and the second signal keeps constant. Furthermore, the influence of EMI noise on transmitted data can be minimized. As a result, although a voltage drop occurs due to a resistance value in the transmission path of the image signal, distortion of the image data can be prevented since a voltage drop in the two signals is generated in the same ratio.

Therefore, although the size of a plasma display panel increases, the distortion of image data supplied to the address electrode X and/or the influence of EMI noise can be minimized.

Meanwhile, it has been described above that a low voltage signal comprising low voltage image data, i.e., a first signal and a second signal is a LVDS. However, a low voltage signal comprising low voltage image data, i.e., a first signal and a second signal can be a BLVDS or a MLVDS.

In other words, in the plasma display apparatus of the present invention, when transmitting and receiving an image signal, a LVDS, a BLVDS, a MLVDS or the like can be employed.

A method of implementing the plasma display apparatus according to the present invention, which has been described above, will now be described with reference to FIGS. 6*a* and 6*b*.

Figure 6A:
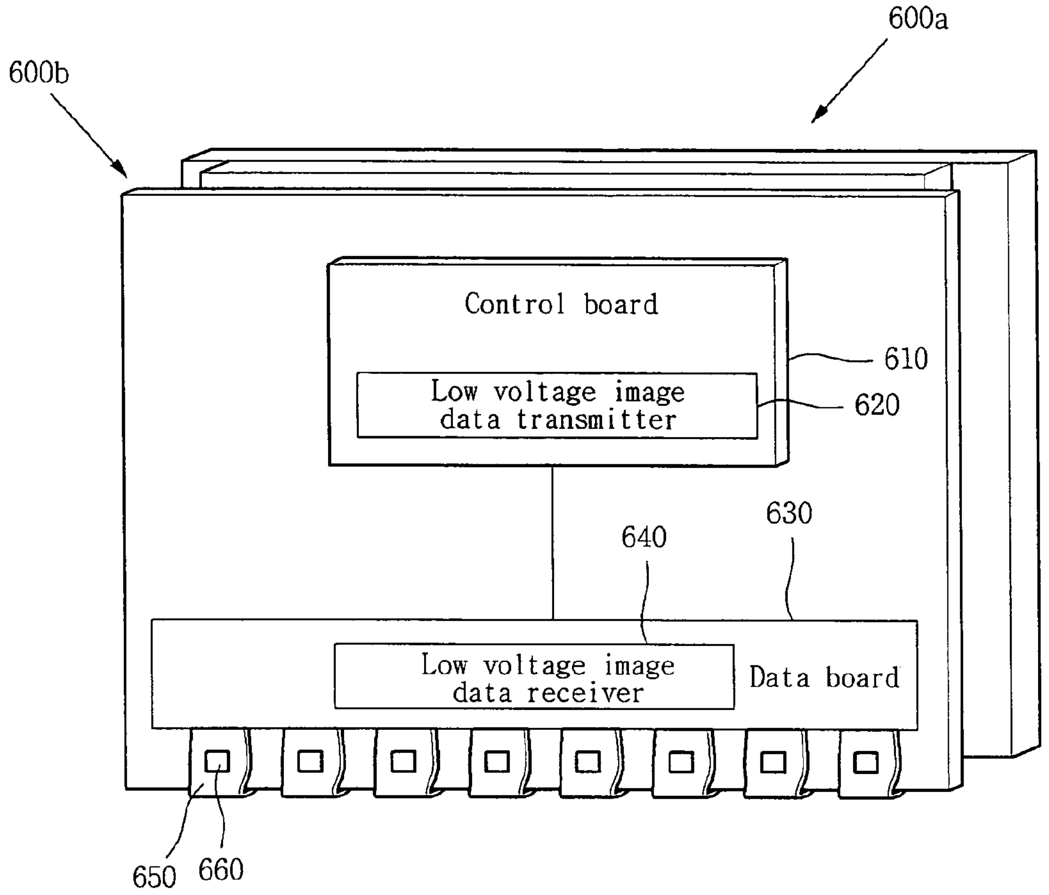
FIGS. 6*a* and 6*b* illustrate an example in which the plasma display apparatus of the present invention is implemented.
Figure 6B:
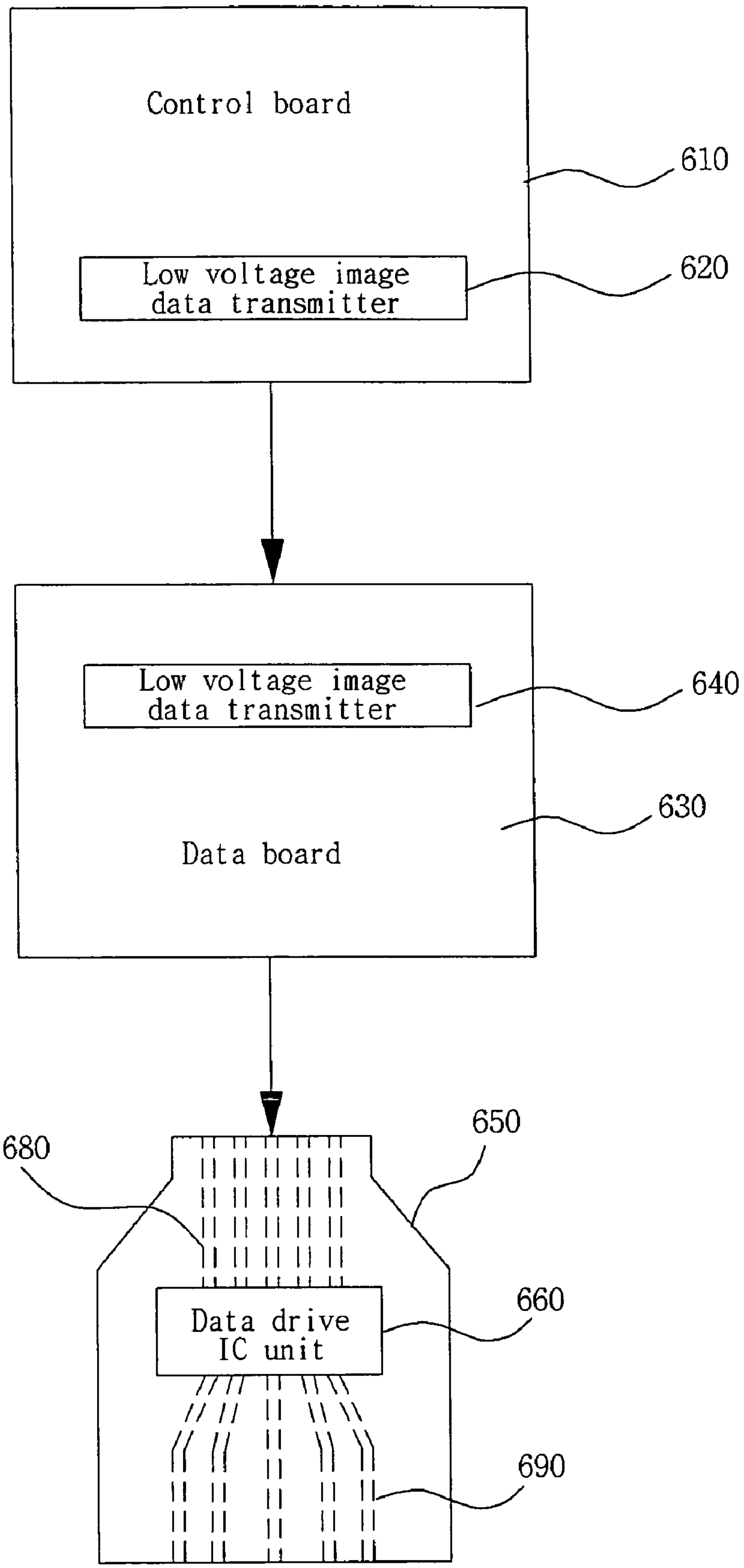

FIGS. 6*a* and 6*b* illustrate an example in which the plasma display apparatus of the present invention is implemented.

Referring to FIGS. 6*a* and 6*b*, a frame 600*b* is disposed on a rear surface of a plasma display panel 600*a*. A control board 610 in which circuits for controlling the operation of the plasma display panel 600*a* can be mounted is disposed on the frame 600*b*.

In this case, a low voltage image data transmitter 620 can be disposed on the control board 610. The reason why the low voltage image data transmitter 620 is disposed on the control board 610 as described above is that image processing processes, such as inverse gamma correction, gain control, halftone control, subfield mapping and data alignment in FIG. 3, are performed in the control board 610. In more detail, in order to transmit an image signal, which has experienced a predetermined image processing process, from the control board 610 to a remote data board 630 without distortion, the low voltage image data transmitter 620 is disposed on the control board 610 to convert an image signal, which has underwent an image process, into low voltage image data, and a low voltage image data receiver 640 is disposed on the data board 630 to receive the low voltage image data output from the low voltage image data transmitter 620.

Furthermore, the data board 630 in which circuits for driving the address electrode X of the plasma display panel 600*a* can be mounted is disposed on the frame 600*b*.

Furthermore, the data drive IC unit 660 can be connected to the data board 630. The data drive IC unit 660 is disposed on a flexible substrate 650. The flexible substrate 650 on which the data drive IC unit 660 is disposed as described above can be preferably connected to the data board 630 and the address electrode X. More preferably, the flexible substrate 650 on which the data drive IC unit 660 is disposed is disposed between the low voltage image data receiver 640 of the data board 630 and the address electrode X of the plasma display panel 600*a*.

The reason why the data drive IC unit 660 is not directly connected to the data board 660, preferably the low voltage image data receiver 640 and the address electrode X, but the flexible substrate 650 is used as described above is that the address electrode X of the plasma display panel 600*a* is disposed on a surface opposite to that of the frame 600*b* where the low voltage image data receiver 640 is disposed.

One or more of the data drive IC unit 660 can be comprised on one flexible substrate 650.

In this case, referring to FIG. 6*b*, five paths 680 through which low voltage image data are supplied from a data board, preferably the low voltage image data receiver 640 to the data drive IC unit 660 are shown on the flexible substrate 650. Five paths 690 through which low voltage image data are supplied from the data drive IC unit 660 to the address electrode X are also shown on the flexible substrate 650. This means that five data drive IC units 660 are disposed on one flexible substrate 650.

The number of the data drive IC unit 660 disposed on the flexible substrate 650 can be adjusted.

It has been shown in FIGS. 6*a* and 6*b* that the low voltage image data transmitter 620 and the low voltage image data receiver 640 are respectively disposed on boards separated from the data drive IC unit 660. That is, the low voltage image data transmitter 620 is disposed on the control board 610 and the low voltage image data receiver 640 is disposed on the data board 630.

However, unlike the above, the low voltage image data receiver 640 and the data drive IC unit 660 can be disposed together. This will be described below with reference to FIGS. 7*a* and 7*b*.

Figure 7A:
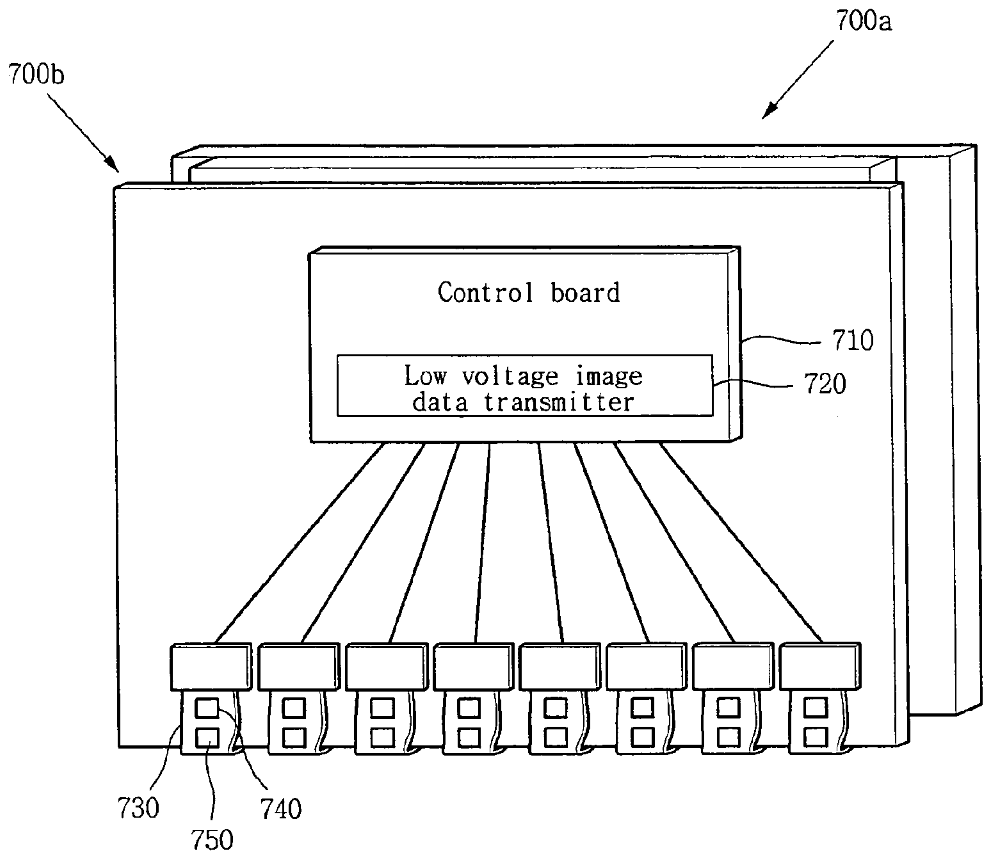
FIGS. 7*a* and 7*b* illustrate an example in which a low voltage image data receiver and a data drive IC unit are disposed together.
Figure 7B:
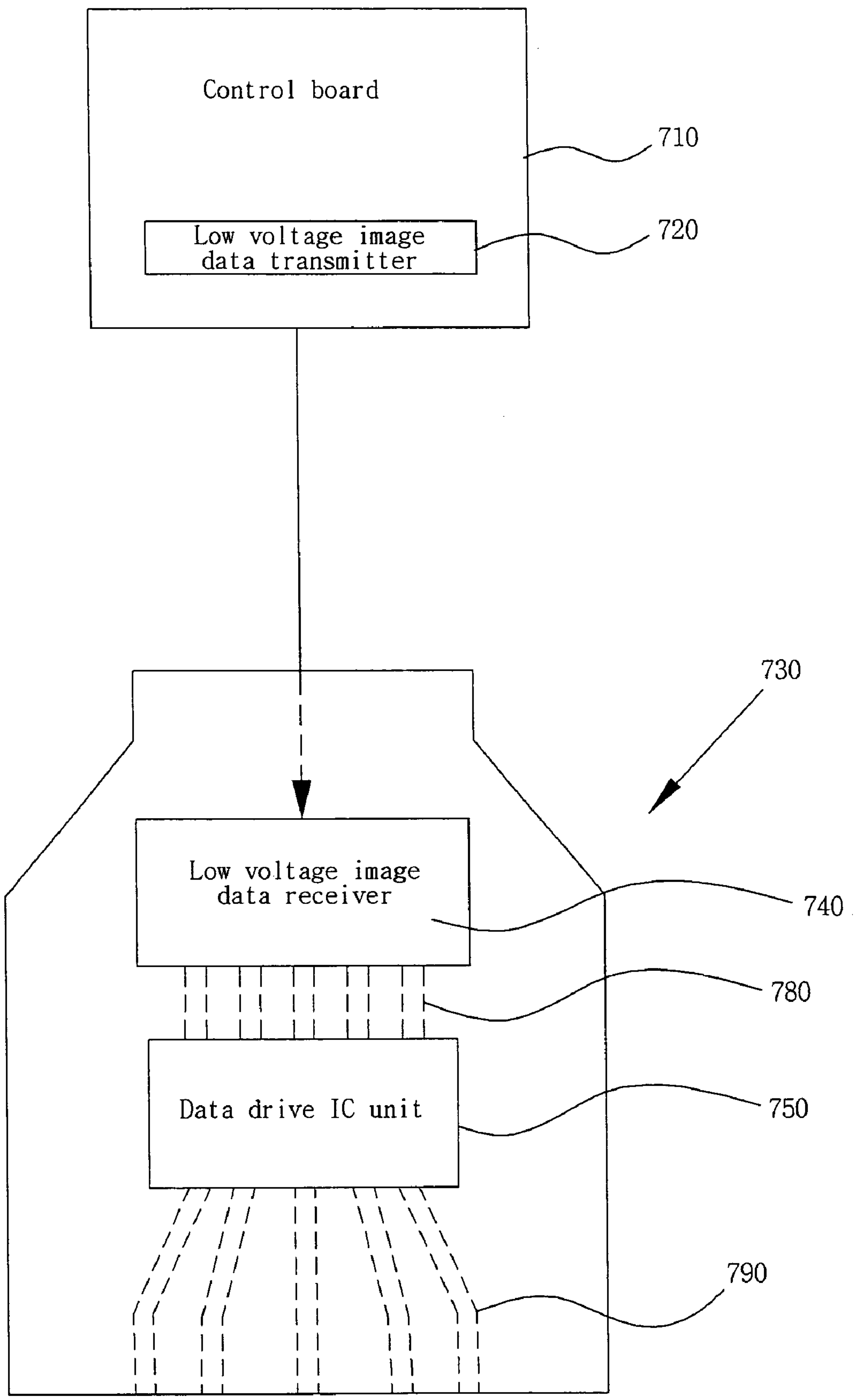

FIGS. 7*a* and 7*b* illustrate an example in which the low voltage image data receiver and the data drive IC unit are disposed together.

Referring to FIGS. 7*a* and 7*b*, unlike FIGS. 6*a* and 6*b*, the data board is omitted, and a low voltage image data receiver 740 is disposed on a flexible substrate 730 together with a data drive IC unit 750.

The reason whey the low voltage image data receiver 740 and the data drive IC unit 750 can be disposed on the flexible substrate 730 as described above is that the number of channels per one chip can be relatively increased in a communication of the low voltage image data receiver 740, e.g., the LVDS method. For example, since a 128-bit on-chip parallel bus can be serialized into eight different channels, the entire number of pins of one chip can be reduced.

If the low voltage image data receiver 740 and the data drive IC unit 750 are commonly disposed on the flexible substrate 730 and the data board is omitted as described above, there is an advantage in that the whole manufacturing unit cost of the plasma display apparatus can be lowered.

Furthermore, as described above in detail, noise can be significantly reduced in the communication method of the low voltage image data receiver 740, e.g., the LVDS method. Therefore, the low voltage image data receiver 740 and the data drive IC unit 750 can be integrated on the flexible substrate 730. That is, the function of the low voltage image data receiver 740 can be added to the data drive IC unit 750 or the function of the data drive IC unit 750 can be performed by the low voltage image data receiver 740.

Though not shown in FIGS. 7*a* and 7*b*, reference numeral 700*a* is the same as 600*a* of FIGS. 6*a* and 6*b*. Furthermore, reference numeral 700*b* is the same as 600*b* of FIGS. 6*a* and 6*b*, reference numeral 710 is the same as 610 of FIGS. 6*a* and 6*b*, reference numeral 720 is the same as 620 of FIGS. 6*a* and 6*b*, reference numeral 780 is the same as 680 of FIGS. 6*a* and 6*b*, and reference numeral 790 is the same as 690 of FIGS. 6*a* and 6*b*. Therefore, description thereof will be omitted in order to avoid redundancy.

A case where the entire plasma display panel is driven by supplying an image signal in one direction of the address electrode X has been described above. However, in the case where the size of the plasma display panel is greatly increased, the whole plasma display panel can be driven by supplying an image signal to the address electrode X in both directions of the plasma display panel. This will be described below with reference to FIG. 8.

Figure 8:
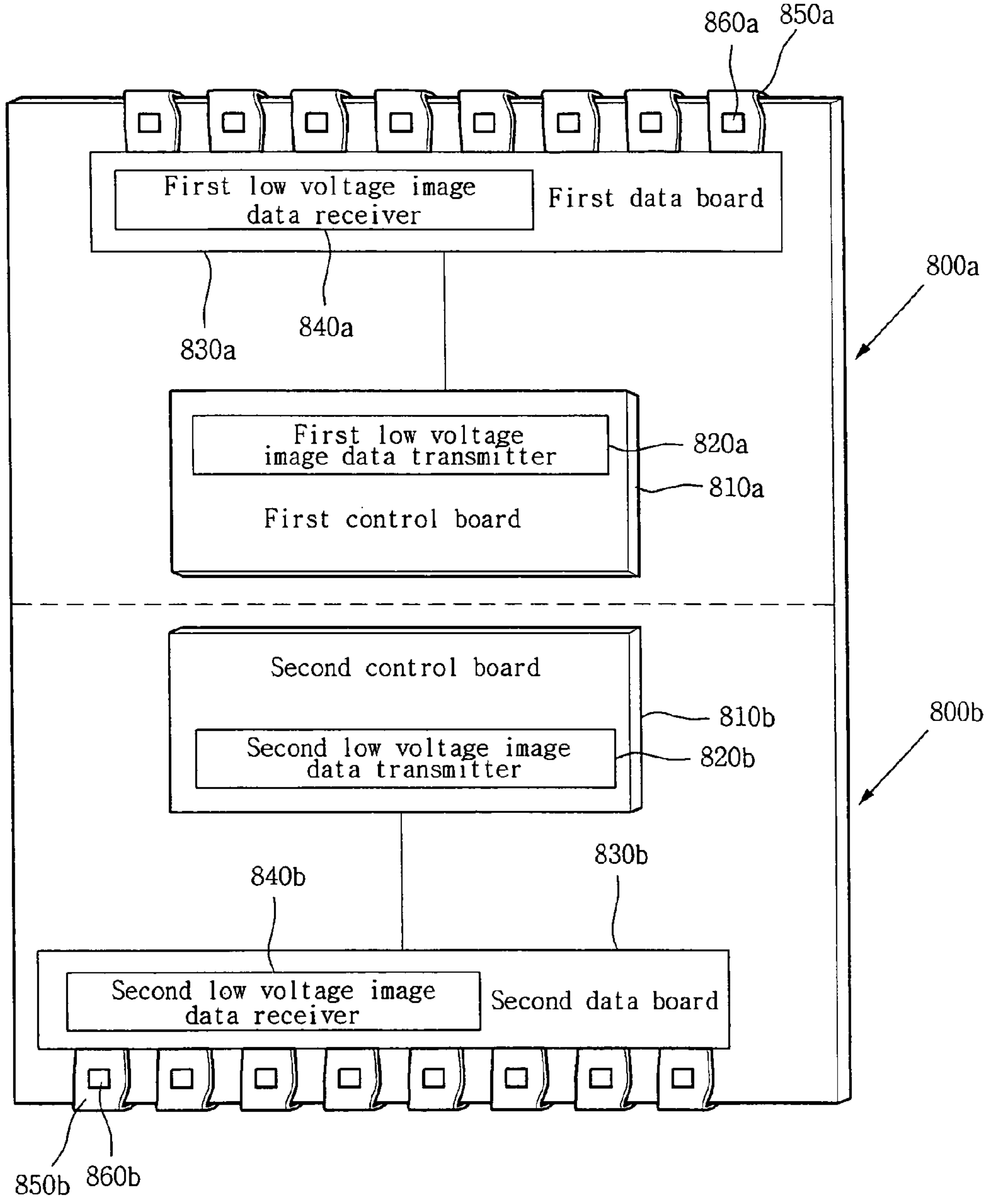
FIG. 8 illustrates the construction of a plasma display apparatus in which the whole plasma display panel is driven by applying an image signal to an address electrode in both directions of the plasma display panel according to the present invention.

FIG. 8 illustrates the construction of a plasma display apparatus in which the whole plasma display panel is driven by applying an image signal to an address electrode in both directions of the plasma display panel according to the present invention.

Referring to FIG. 8, one plasma display panel is divided into a plurality of screen regions, e.g., a first screen region 800*a* and a second screen region 800*b*.

An address electrode group, such as a first address electrode group (not shown), is formed in the first screen region 800*a*. A second address electrode group is formed in the second screen region 800*b*. An address electrode of the first address electrode group and an address electrode of the second address electrode group are physically isolated from each other.

In this case, each of a first data driver for driving the first address electrode group and a second data driver for driving the second address electrode group comprises a low voltage image data transmitter, a low voltage image data receiver and a data drive IC unit as shown in FIGS. 6*a* and 6*b*.

For example, the first data driver for driving the first address electrode group of the first screen region 800*a* comprises a first low voltage image data transmitter 820*a* on a first control board 810*a*, a first low voltage image data receiver 840*a* on a first data board 830*a*, and a first data drive IC unit 860*a* on a first flexible substrate 850*a*.

Furthermore, the second data driver for driving the second address electrode group of the second screen region 800*b* comprises a second low voltage image data transmitter 820*b* on a second control board 810*b*, a second low voltage image data receiver 840*b* on a second data board 830*b* and a second data drive IC unit 860*b* on a second flexible substrate 850*b*.

If one plasma display panel is driven with it being divided into a plurality of screen regions as described above, a time taken to scan the entire discharge cells formed in the plasma display panel can be reduced and a driving time can be sufficiently secured accordingly. Therefore, overall driving efficiency of the plasma display apparatus according to the present invention can be enhanced.

A case where the low voltage image data receiver and the data drive IC unit are disposed on different substrates, as in FIGS. 6*a* and 6*b*. FIG. 8, is shown in FIG. 8. However, both the low voltage image data receiver and the data drive IC unit can be disposed on the flexible substrate as in FIGS. 7*a* and 7*b*. That is, in the first data driver, the low voltage image data receiver 840*a* and the data drive IC unit 860*a* can be commonly disposed on one flexible substrate 850*a*. In the second data driver, the low voltage image data receiver 840*b* and the data drive IC unit 860*b* can be commonly disposed on one flexible substrate 850*b*.

Meanwhile, in the plasma display apparatus of the present invention, a buffer can be used in order to improve the transmission rate of an image signal. This will be described below with reference to FIGS. 9*a* and 9*b*.

Figure 9A:
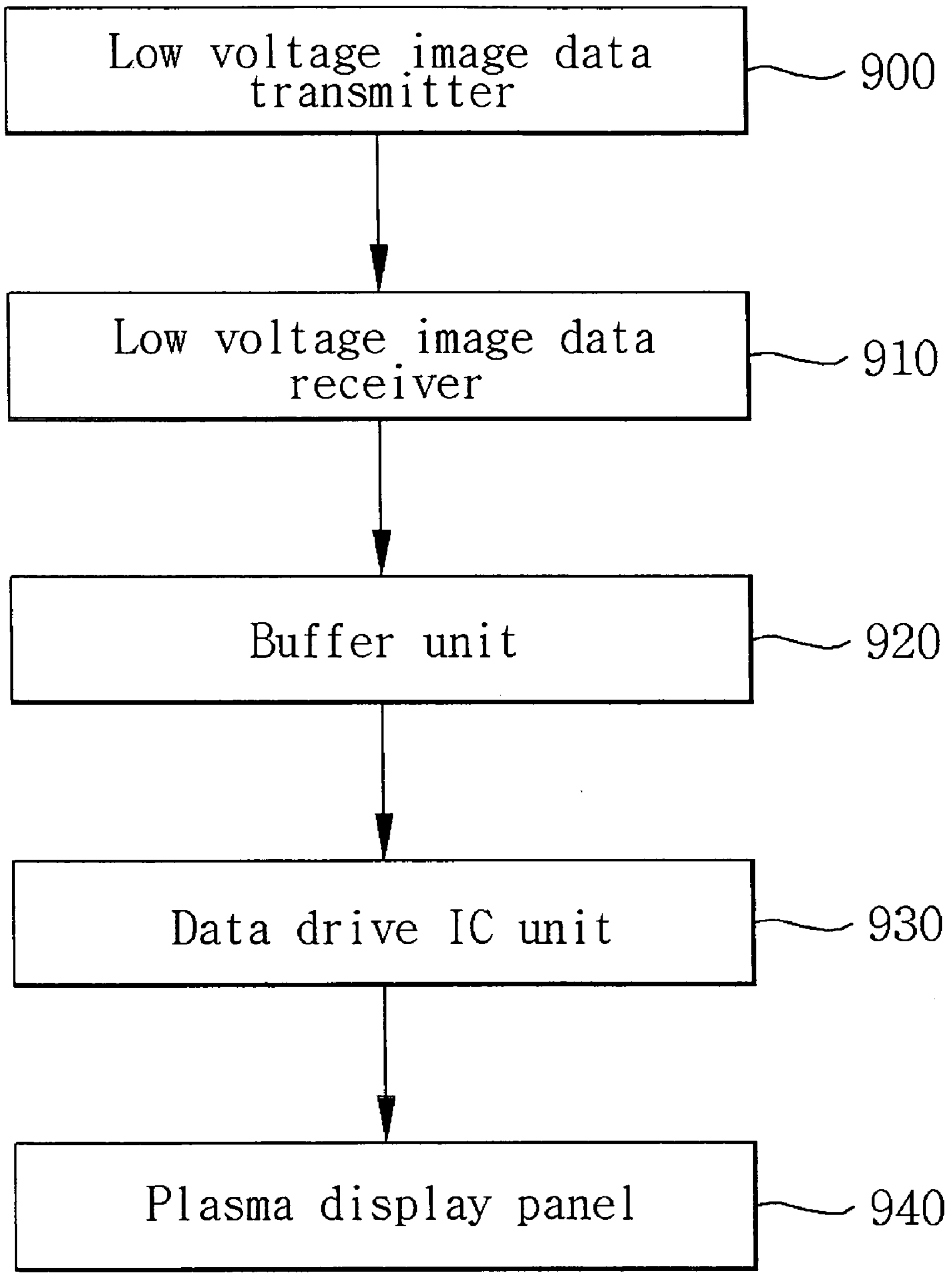
FIGS. 9*a* and 9*b* illustrate the construction of a plasma display apparatus in which a buffer is used according to the present invention.
Figure 9B:
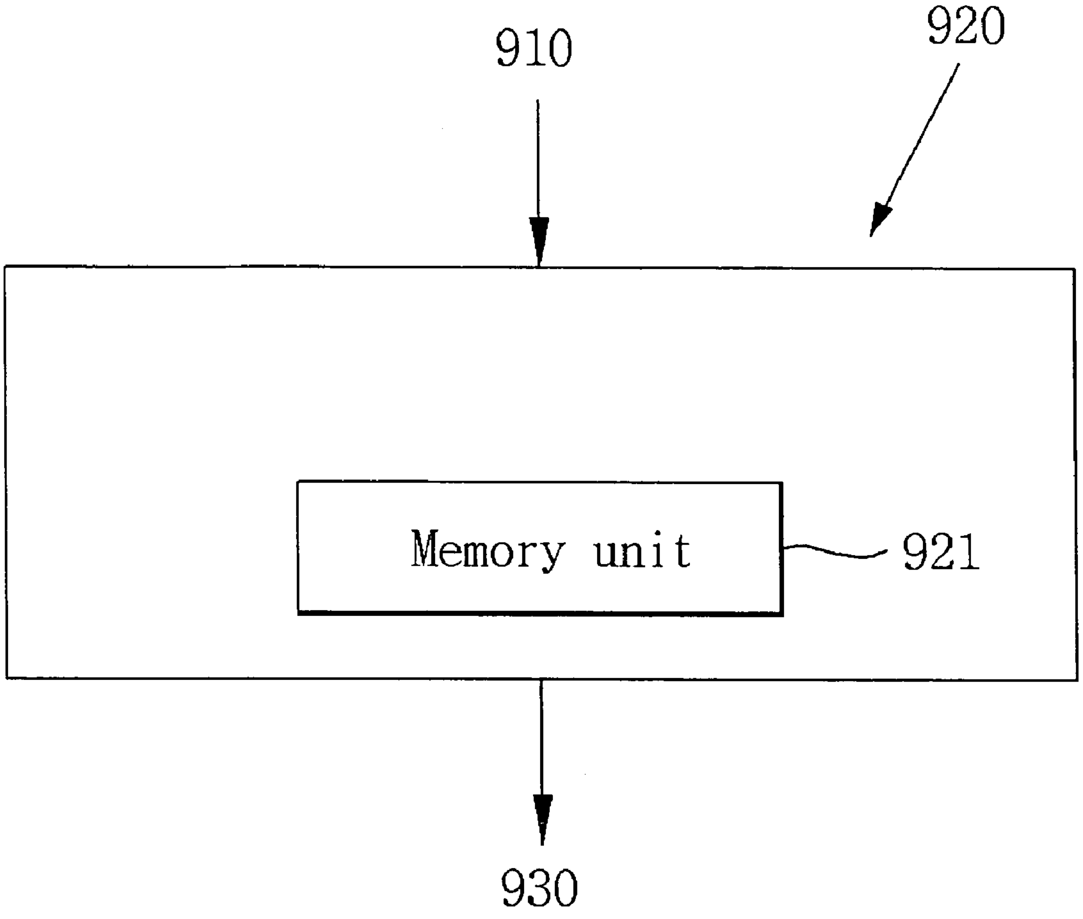

FIGS. 9*a* and 9*b* illustrate the construction of a plasma display apparatus in which a buffer is used according to the present invention.

Referring to FIGS. 9*a* and 9*b*, the plasma display apparatus of the present invention comprises a low voltage image data transmitter 900, a low voltage image data receiver 910, a buffer unit 920 and a data drive IC unit 930.

The buffer unit 920 can comprise a memory unit 921 for storing an image signal restored by the low voltage image data receiver 910, as shown in FIG. 9*b*.

The low voltage image data transmitter 900 converts an externally input image signal into low voltage image data and transmits the converted low voltage image data.

The low voltage image data receiver 910 receives the low voltage image data and restores an image signal prior to the conversion by the low voltage image data transmitter 900.

The buffer unit 920 buffers the image signal restored by the low voltage image data receiver 910.

The buffer unit 920 supplies a corresponding image signal to the data drive IC unit 930 when the supply of data is requested where the image signal restored by the low voltage image data receiver 910 is previously stored in the memory unit 921.

The data drive IC unit 930 supplies the image signal that is buffered in the buffer unit 920 to the address electrode X of the plasma display panel 940 through a switching operation.

The buffer unit 920 performs an operation of supplying a corresponding image signal to a corresponding data drive IC unit 930 in response to a request for data supply in a state where it receives and stores an image signal restored by the low voltage image data receiver 910. Therefore, the supply speed of the image signal can be increased and driving efficiency of the plasma display apparatus according to the present invention can be enhanced accordingly.

For example, it is assumed that in the plasma display apparatus of the present invention in which the buffer unit 920 is omitted, a total driving time is 10 seconds and a time where an image signal is supplied to the address electrode X, of the total amount of time of 10 seconds, is 2 seconds.

The low voltage image data receiver must receive low voltage image data from the low voltage image data transmitter only during 2 seconds of 10 seconds, and must restore an image signal and supply the restored image signal to the data drive IC unit during the 2 seconds. Therefore, driving efficiency is lowered due to the shortage of a driving time, and the supply speed of an image signal is also lowered.

Meanwhile, if the buffer unit 920 is further added between the low voltage image data receiver 910 and the data drive IC unit 930 as in FIGS. 9*a* and 9*b*, the low voltage image data receiver 910 can continue to receive image data from the low voltage image data transmitter 900 and can restore an image signal, during the entire driving time of 10 seconds. In this case, in the case where the supply of an image signal to the data drive IC unit 930 is requested, the restored image signal can be supplied to the data drive IC unit 930 during 2 seconds.

Therefore, the shortage of a driving time can be prevented and driving efficiency can be prevented from lowering. It is also possible to prevent the supply speed of an image signal from lowering.

The method of implementing the plasma display apparatus of the present invention, which has been described with reference to FIGS. 9*a* and 9*b*, will be described below with reference to FIGS. 10*a* and 10*b*.

Figure 10A:
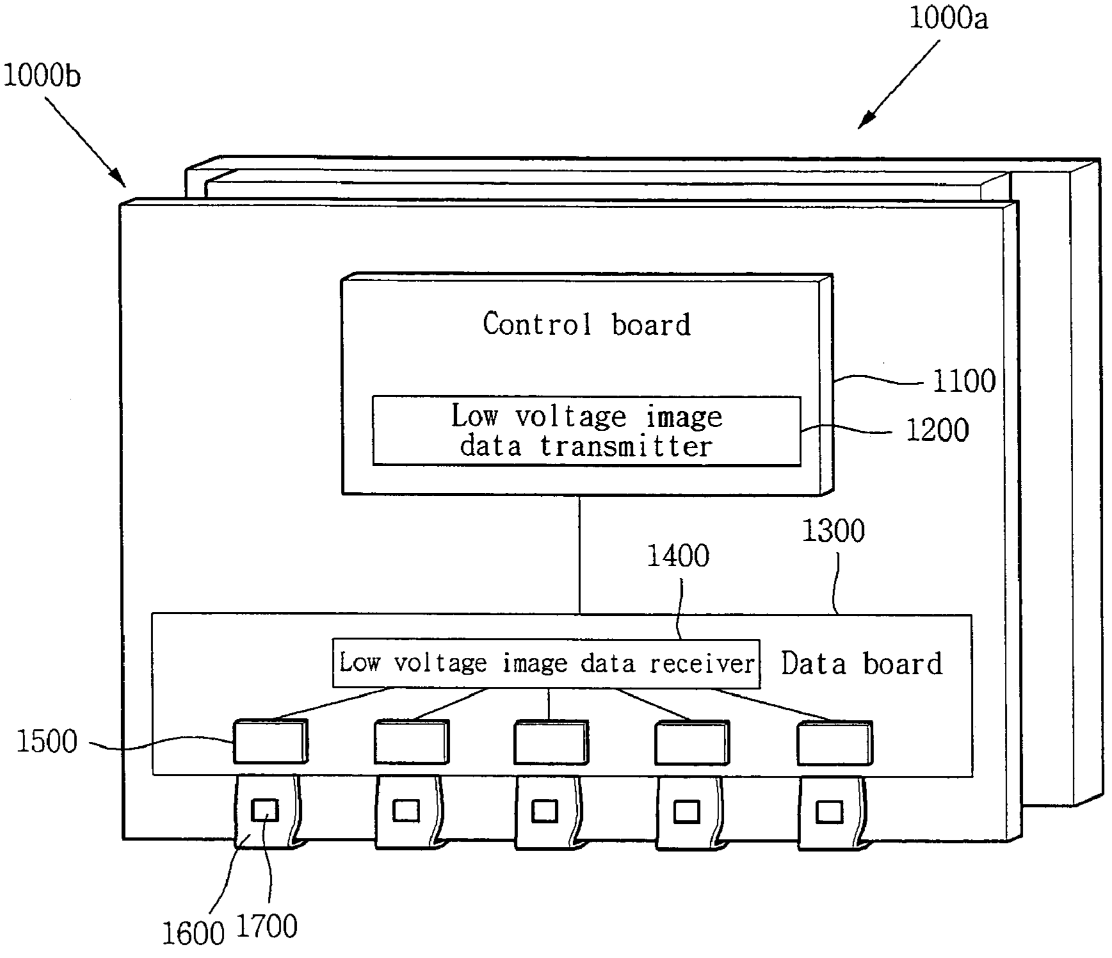
FIGS. 10*a* and 10*b* illustrate an example in which the plasma display apparatus of the present invention as shown in FIGS. 9*a* and 9*b* is implemented.
Figure 10B:
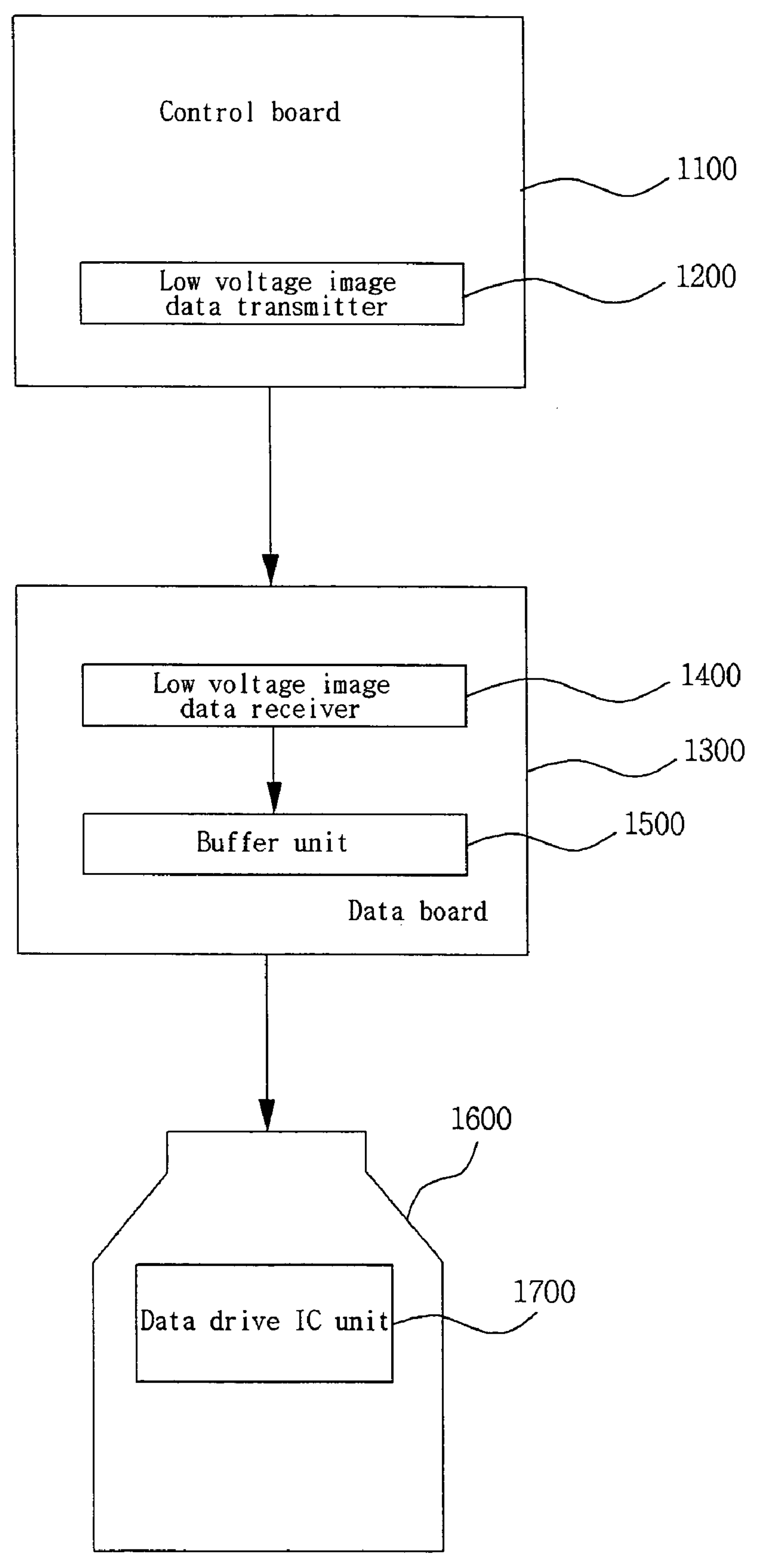

FIGS. 10*a* and 10*b* illustrate an example in which the plasma display apparatus of the present invention as shown in FIGS. 9*a* and 9*b* is implemented.

Referring to FIGS. 10*a* and 10*b*, a low voltage image data receiver 1400 and a buffer unit 1500 are together disposed on a data board 1300. That is, the buffer unit 1500 and the low voltage image data receiver 1400 can be preferably disposed on one board separated from a data drive IC unit 1700, i.e., the data board 1300. It has been shown in FIGS. 10*a* and 10*b* that the buffer unit 1500 and the low voltage image data receiver 1400 are separately formed. However, the buffer unit 1500 and the low voltage image data receiver 1400 can be integrated on a flexible substrate 1600.

In FIGS. 10*a* and 10*b*, the same description as that of FIGS. 6*a* and 6*b* will be omitted.

Furthermore, the plasma display apparatus further comprising the buffer unit 1500 according to the present invention can be applied to the method of driving one plasma display panel with it being divided into a plurality of screen regions as shown in FIG. 8. This will be described below with reference to FIG. 11.

Figure 11:
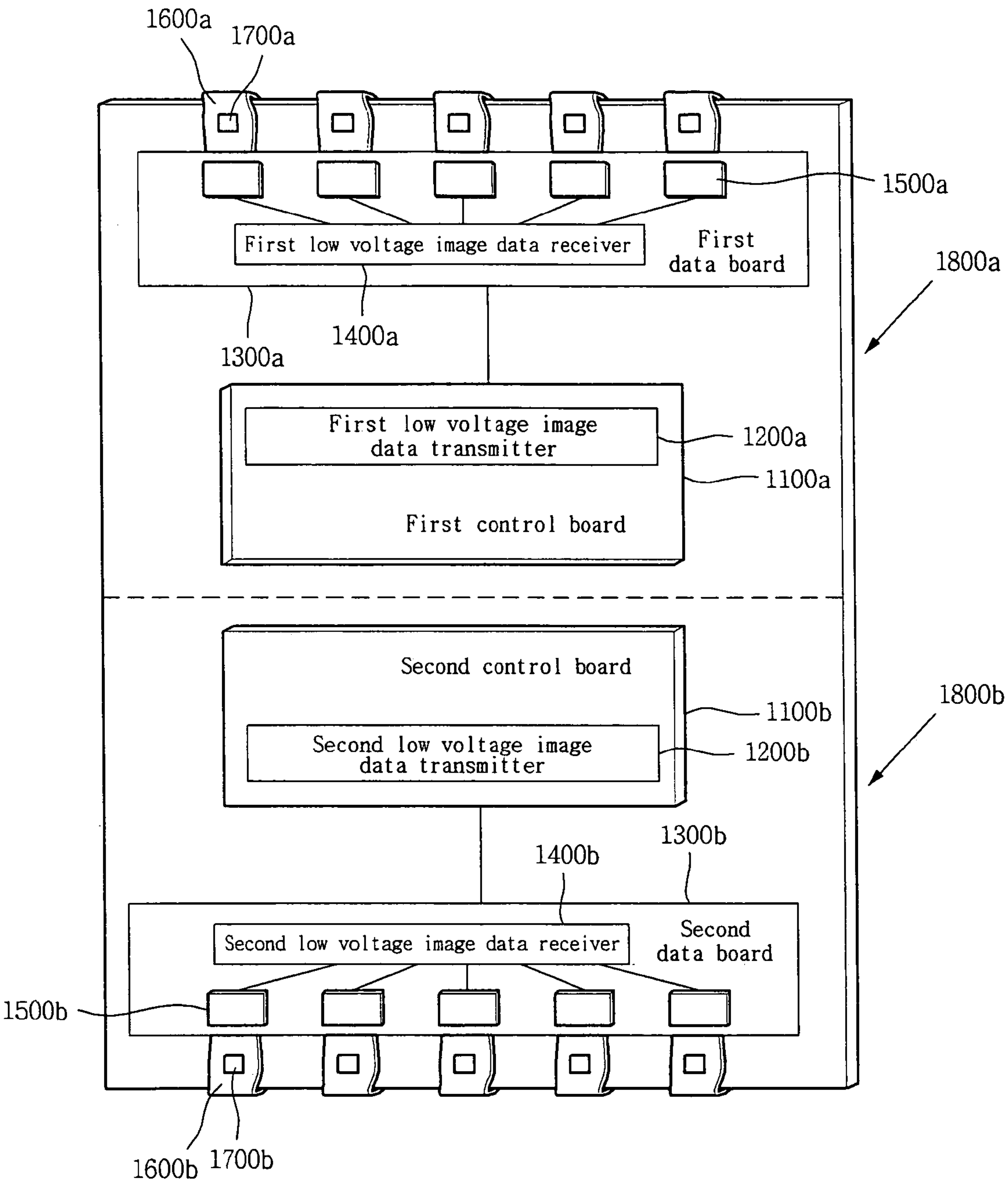
FIG. 11 illustrates another construction of a plasma display apparatus in which the whole plasma display panel is driven by applying an image signal to an address electrode in both directions of the plasma display panel according to the present invention.

FIG. 11 illustrates another construction of a plasma display apparatus in which the whole plasma display panel is driven by applying an image signal to an address electrode in both directions of the plasma display panel according to the present invention.

Referring to FIG. 11, in the same manner as FIG. 8, one plasma display panel is divided into a plurality of screen regions, e.g., a first screen region 1800*a* and a second screen region 1800*b*.

Each of a first data driver for driving a first address electrode group corresponding to the first screen region 1800*a* and a second data driver for driving a second address electrode group corresponding to the second screen region 1800*b* comprises a low voltage image data transmitter, a low voltage image data receiver, a buffer unit and a data drive IC unit, as in FIGS. 10*a* and 10*b*.

For example, the first data driver for driving the first address electrode group of the first screen region 1800*a* comprises a first low voltage image data transmitter 1200*a* on a first control board 10*a*, a first low voltage image data receiver 1400*a* and a buffer unit 1500*a* on a first data board 1300*a*, and a first data drive IC unit 1700*a* on a first flexible substrate 1600*a*.

Furthermore, the second data driver for driving the second address electrode group of the second screen region 1800*b* comprises a second low voltage image data transmitter 1200*b* on a second control board 1100*b*, a second low voltage image data receiver 1400*b* and a buffer unit 1500*b* on a second data board 1300*b*, and a second data drive IC unit 1700*b* on a second flexible substrate 1600*b*.

In the first data driver, the buffer unit 1500*a* and the low voltage image data receiver 1400*a* can be disposed on one board separated from the data drive IC unit 1700*a*, preferably the data board 1300*a*. In the second data driver, the buffer unit 1500*b* and the low voltage image data receiver 1400*b* can be disposed on one board separated from the data drive IC unit 1700*b*, preferably the data board 1300*b*.

Description of FIG. 11 is the same as that of FIG. 8. Therefore, description thereof will be omitted for simplicity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plasma display apparatus comprising:

an image data transmitter for converting an externally input image signal into image data and for transmitting the converted image data;

an image data receiver for receiving the image data and for restoring an image signal;

a buffer to store the image signal restored by the image data receiver; and a data driver for supplying the image signal supplied by the buffer to an address electrode of a plasma display panel through a switching operation, wherein the image data receiver and the data driver are commonly disposed on one flexible substrate, wherein the buffer is disposed between the image data receiver and data driver, and wherein the buffer supplies the image signal to the data driver when the data driver requests supply of the image data, in a state where the image signal restored by the image data receiver has been previously stored in the buffer.

2. The plasma display apparatus as claimed in claim 1, wherein the image data receiver and the data driver are integrated.

3. The plasma display apparatus as claimed in claim 1, wherein one or more of data drivers are located on the flexible substrate.

4. The plasma display apparatus as claimed in claim 1, wherein the image data transmitter and the image data receiver are respectively disposed on boards separated from the data driver.

5. The plasma display apparatus as claimed in claim 1, wherein a voltage signal corresponding to the image data comprises a first signal and a second signal being an inverted signal of the first signal, and wherein the image data transmitter converts the image signal into the voltage signal and transmits the converted voltage signal to the image data receiver.

6. The plasma display apparatus as claimed in claim 5, wherein the image data receiver restores the image signal based on a difference between a voltage level of the first signal and a voltage level of the second signal.

7. The plasma display apparatus as claimed in claim 5, wherein the voltage signal is any one of a Low Voltage Differential Signal (LVDS), a Bus Low Voltage Differential Signal (BLVDS), or a Multipoint Low Voltage Differential Signal (MLVDS).

8. The plasma display apparatus as claimed in claim 5, wherein a difference between a voltage level of the first signal and a voltage level of the second signal ranges from more than 0.2V to less than 0.5V.

9. The plasma display apparatus as claimed in claim 8, wherein the difference between the voltage level of the first signal and the voltage level of the second signal ranges from 0.3V to 0.4V.

10. The plasma display apparatus as claimed in claim 1, wherein the image data transmitter is mounted on a control board for controlling the driving of the plasma display panel.

* * * * *